US005943523A

United States Patent [19]

Merle et al.

[11] Patent Number: 5,943,523

[45] Date of Patent: Aug. 24, 1999

[54] SEMIAUTOMATIC FILM DESPLICER

[75] Inventors: Thomas C. Merle; Dale W. Ryan, both of Rochester, N.Y.

[73] Assignee: Eastman Kodak Company, Rochester, N.Y.

[21] Appl. No.: 08/964,480

[22] Filed: Nov. 5, 1997

[51] Int. Cl.[6] .............................. B32B 4/00; G03D 17/00

[52] U.S. Cl. ............................................ 396/598; 156/344

[58] Field of Search .................................... 396/564, 598; 242/551, 553, 554.1; 156/344, 502, 506, 507, 584; 29/426.5, 426.1

[56] References Cited

U.S. PATENT DOCUMENTS

| | | | |
|---|---|---|---|
| 3,986,919 | 10/1976 | Andrews | 156/157 |
| 4,323,201 | 4/1982 | Gonzalez | 242/523.1 |
| 5,373,339 | 12/1994 | Greene et al. | 156/344 |
| 5,473,402 | 12/1995 | Long et al. | 396/269 |
| 5,608,487 | 3/1997 | Pierce et al. | 396/564 |
| 5,679,207 | 10/1997 | Palone et al. | 156/507 |
| 5,807,459 | 9/1998 | Merle | 156/344 |

*Primary Examiner*—D. Rutledge
*Attorney, Agent, or Firm*—Francis H. Boos, Jr.

[57] ABSTRACT

Manually controlled semi-automatic apparatus for desplicing film strips particularly as part of a photofinishing process includes a desplicing station mounted on a rocking arm for automatically positioning the desplicing station at first and second splice regions of the splice tape for separation of successive film strips from the splice tape in successive desplicing cycles. A tensioning mechanism, including actuator operated tensioning rollers, is mounted entirely on one side of the desplicing mechanism and operates automatically to tension the splice film during the first desplicing cycle in which one film strip is removed from the splice tape and to tension a splice tape pickup web and remaining film strip during the second desplicing cycle, the tensioning mechanism minimizing operator handling of the film during the desplicing operation.

12 Claims, 11 Drawing Sheets

SEMIAUTOMATIC FILM DESPLICER

FIELD OF THE INVENTION

The invention relates to photography, and the removal of splices from the ends of film strips. More specifically the invention relates to the non-destructive separation of film strips from splices with the ends of the film strips intact.

BACKGROUND OF THE INVENTION

Typically, exposed photographic film is spliced together for development and printing to facilitate handling of the film in automated equipment. Individual film rolls are removed from their containers, called cartridges or cassettes, and the resulting film strips are coupled together end-to-end with splices. The coupled strips form a long ribbon that is threaded and follows a sinuous path through processing equipment, into and out of developing solutions and drying chambers. Most of the processing steps are completed in the dark. Such rough handling, and the severe consequences of a break, require a secure attachment at every splice. The splices include a tough paper or plastic backing coated with a thermal adhesive. Usually the splices are applied to the film strips with heat and pressure.

In the case of 35 mm film, after processing, the film is cut to remove the splices and again to divide the film strip corresponding to a complete customer order into smaller segments, such as four, five or six negative frames per segment. This is anticipated during film manufacture, when leaders and trailers at the ends of the film strips are provided with extra material.

In a newly introduced photographic system, generally referred to as the Advanced Photo System, the film strips are returned after processing to the same cartridge that was used for loading the film into the camera. The splice may still be removed by cutting, but the cut film strip must then be re-shaped and reinserted into the cartridge for return to the customer. Although cutting is a simple approach for removing splices, it obviously damages and shortens the film compared to its manufactured state. These Advanced Photo System film strips have a special configuration at their leading and trailing ends. At the trailing end the shape facilitates attachment of the film to a spool inside the cartridge. At the leading end the shape reduces friction at the cartridge exit to facilitate thrusting out of the film for viewing or reordering prints. When the film is cut, the configuration and its accompanying features either are lost, or must be included in the cutting die.

Film strips typically are manufactured with extra material to accommodate splice removal during processing. Again the approach is simple, but adds material expense, including silver, a precious metal. This material then must be disposed of after processing. The amounts are small when compared to a single film strip, but build up at the photofinishing level. Silver is a heavy metal that requires special disposal procedures. For the foregoing reasons, therefore, it is desirable to provide apparatus and methods for removing the splice tape from film strips after the processing steps without damaging the leading and trailing ends of the film strips.

In commonly assigned U.S. Pat. No. 5,373,339, a non-destructive, automated method and apparatus for desplicing photographic film is shown in which a film splice and splice pick-up web are positioned between a vertically reciprocating heat shoe and a platen. The heat shoe is pressed down to the splice to heat the thermal splice adhesive thereby allowing the film strips to be pulled free of the splice when the heat shoe pressure is removed. In order to retain the detached splice tape in position over the splice pickup web while the films are pulled apart, a retaining rod aligned with the splice space between the two film strips is pressed up through the platen surface to hold the splice tape against the heat until the films have been removed. Once the films are removed, the heat shoe and retaining rod are then lowered to tack the splice tape to the splice pickup web and the web is advanced to remove the splice tape from the area of the heat shoe. While satisfactory for its purpose, it requires accurate positioning of the film in the heat shoe area to ensure proper alignment of the retaining rod with the splice space between the film strips. Additionally, if the film strips are contiguous, without any space between the film strips, it requires that the film strips be cut to separate them from each other, which damages the film strip ends and leaves the splice tape on the film ends, an unsatisfactory situation, particularly at the leader end which can interfere with smooth thrusting of the film strip from its storage cartridge.

In copending application Ser. No. 08/819,402, filed Mar. 17,1997, now U.S. Pat. No. 5,807,459, apparatus and method for separating spliced strips of photographic film is disclosed which addresses the foregoing concerns. While effective, the disclosed apparatus is somewhat cumbersome to operate and thus there is a need for slightly more automated equipment that facilitates the desplicing function with a minimum of handling by the operator. The present invention addresses this need.

SUMMARY OF THE INVENTION

Thus in accordance with the invention, there is provided apparatus for separating first and second photographic film strips from a splice tape, the film strips being attached with thermal adhesive to first and second regions, respectively, of the splice tape. In a preferred embodiment, the apparatus comprises a desplicing mechanism having a heat head and a platen forming a desplicing station there between, the mechanism being mounted for movement laterally between first and second desplicing positions to align the desplicing station sequentially with the first and second regions of the splice tape positioned within the desplicing station and means for moving the desplicing mechanism to a first position which places the desplicing station in alignment with the first splice tape region during a first desplicing cycle and to a second position which places the desplicing station in alignment with the second splice tape region during a second desplicing cycle. The apparatus also includes spliced film supply means upstream of the desplicing station for supplying the first and second spliced film strips to the desplicing mechanism and pickup web means including a pickup web supply spool upstream of the desplicing station and a pickup web take-up spool downstream of the desplicing station for supplying a splice tape pickup web. The apparatus further includes a tensioning drive mechanism downstream of the desplicing station operative to place the first and second film strips under tension during the first desplicing cycle in which the first film strip is removed from the splice tape and to place the pickup web and second film strip under tension during the second desplicing cycle in which the second film strip and desplicing tape are separated.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the drawings:

FIGS. 5–12 are schematic front views of the principal elements of the desplicing apparatus illustrating the functioning of the apparatus at successive stages of the desplicing operation.

DETAILED DESCRIPTION OF THE INVENTION

Figure 1:
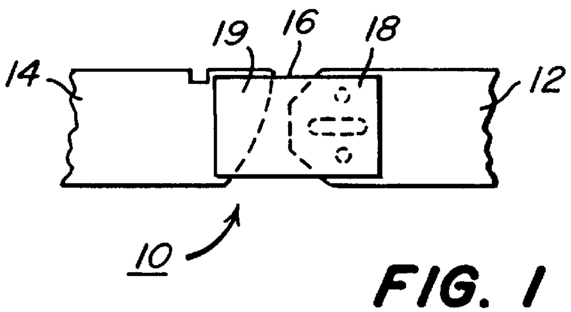
FIG. 1 is a plan view of a film strip splice.

In FIG. 1, a typical film splice arrangement 10 is shown in which a first film strip 12 is spliced to a second film strip 14 by means of a splice tape 16 adhesively secured to the film strips in regions 18 and 19, respectively. Splice tape 16 is typical of products used by the photofinishing industry today and includes treated paper with a layer of thermal adhesive on one surface. Examples of such adhesive include Buna S, a poly(styrene-cobutadiene) and Buna N, a poly (acrylonitrile-cobutadiene), both widely available to the industry under a number of trade names. Splice tape 16 is applied to film strips 12 and 14 with heat and pressure. Successive film strips thus are coupled securely together to make up a continuous web of film strips for film processing applications. The adhesive is a thermoplastic and will soften beginning at approximately 120° C.

Figure 2:
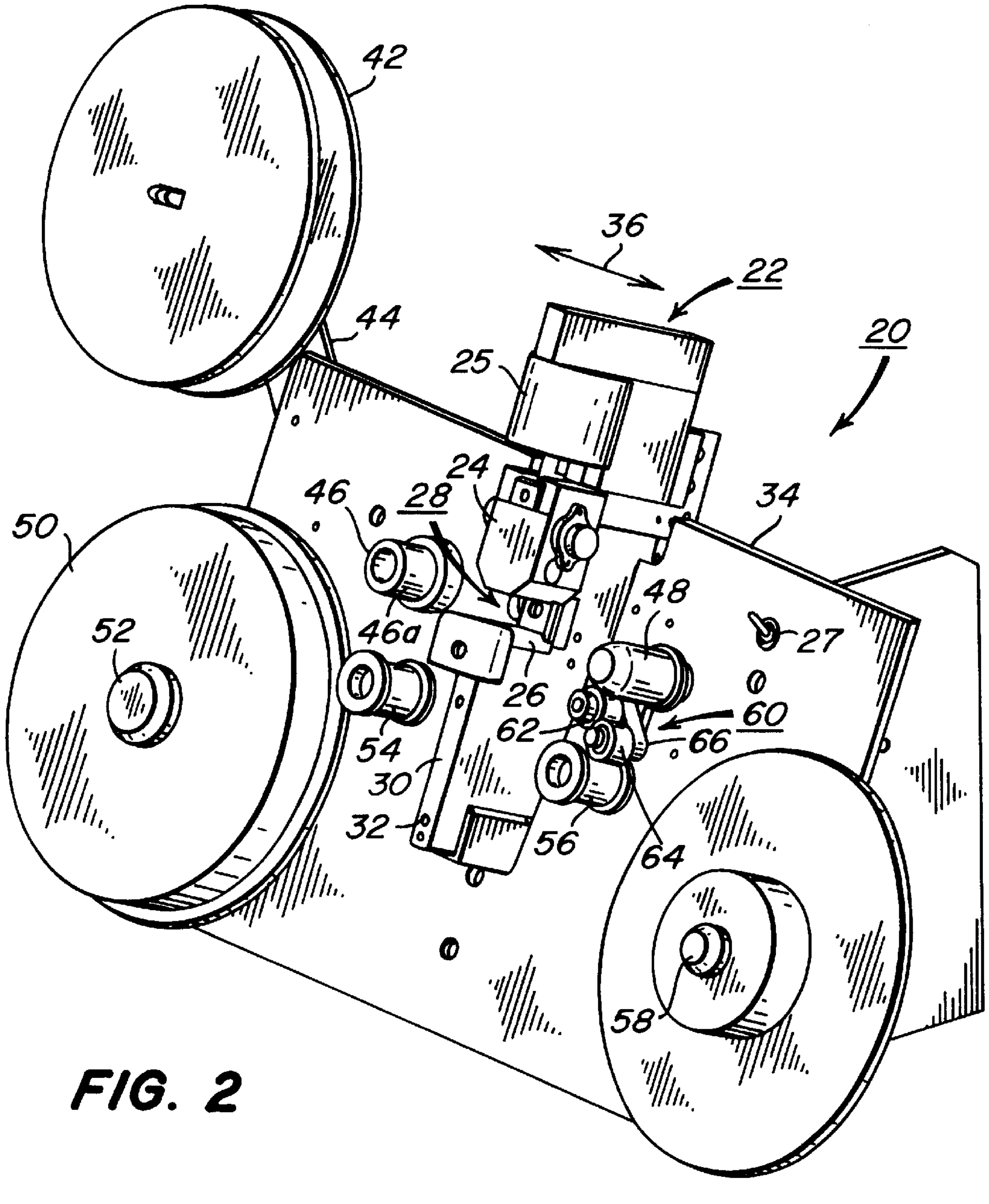
FIG. 2 is a front isometric view of desplicer apparatus constructed in accordance with the invention.

In FIG. 2, a preferred embodiment of the film desplicing apparatus 20 of the present invention includes a desplicing mechanism 22 having a heat head 24 and a platen 26 forming a desplicing station 28 there between. Platen 26 is preferably made of a low friction non-stick material such as, PTFE ("Teflon"). The heat head 24 is reciprocally mounted on a rocking frame 30. Frame 30 is pivotably supported at 32 on a support panel 34 for movement of the desplicing station 28 laterally between first and second desplicing positions as indicated by arrow 36 to align the desplicing station 28 sequentially with the first and second regions 18, 19 of the splice tape 16 when the film splice positioned within the desplicing station 28, as will be described in more detail subsequently. Frame 30 is actuated in conventional manner by means of a pneumatically operated positioning cylinder 40 (FIG. 4) mounted on the back side of panel 34. Cylinder 40 comprises means for moving the desplicing mechanism 22 to a first position, toward the right as seen in FIG. 2, which places the desplicing station in alignment with the first splice tape region 18 during a first desplicing cycle and to a second position, towards the left, which places the desplicing station in alignment with the second splice tape region 19 during a second desplicing cycle. Heat head 24 is reciprocally actuated by a pneumatic pressure cylinder 25 controlled from a user-operated air switch 27. Cylinder 25 operates to move the heat head down to the platen to apply pressure to the film splice in the splicing station. While the heat head is pressed against the splice, heat is applied by the heat head to soften the splice adhesive. When the pressure is reduced by raising the heat head, the film, which is under tension, is separated from the splice tape. The construction and operation of the reciprocating heat head is well known and need not be discussed further. A pneumatic timer (not shown) controls the duration that the heat head is pressed against the film splice.

A splice film reel 42 is rotatably supported at one end of a mounting arm 44, the other end of arm 44 being fixedly attached to the back side of panel 34. Film reel 42 comprises spliced film supply means mounted upstream of the desplicing station 28 for supplying a roll of first and second spliced film strips 12, 14 to the desplicing mechanism 22. Rolls 46 and 48 serve as backer rolls supporting the spliced film strips threaded through the desplicing station 28. Roll 46 is stationary, i.e. non-rotatable, and is provided with a high friction surface 46*a* to allow the operator of the desplicer apparatus to wrap a film strip approximately half way around the roll and thereby easily hold the film strip fixedly in position against tensioning forces exerted during the desplicing operations to be described. Roll 48 is a rotatable roller.

A roll of splice tape pickup web 50 is supported on spool 52 rotatably mounted on the front of panel 34 upstream of the desplicing station 28 to supply the pickup web needed to carry splice tape away from the desplicing station after being separated from the film strips. Rotatable rolls 54 and 56 support the pickup web which is threaded counterclockwise from the bottom of the supply web roll 50 over the top of roll 54, over the platen 26, the top of roll 56 and around the take-up spool 58.

Figure 3:
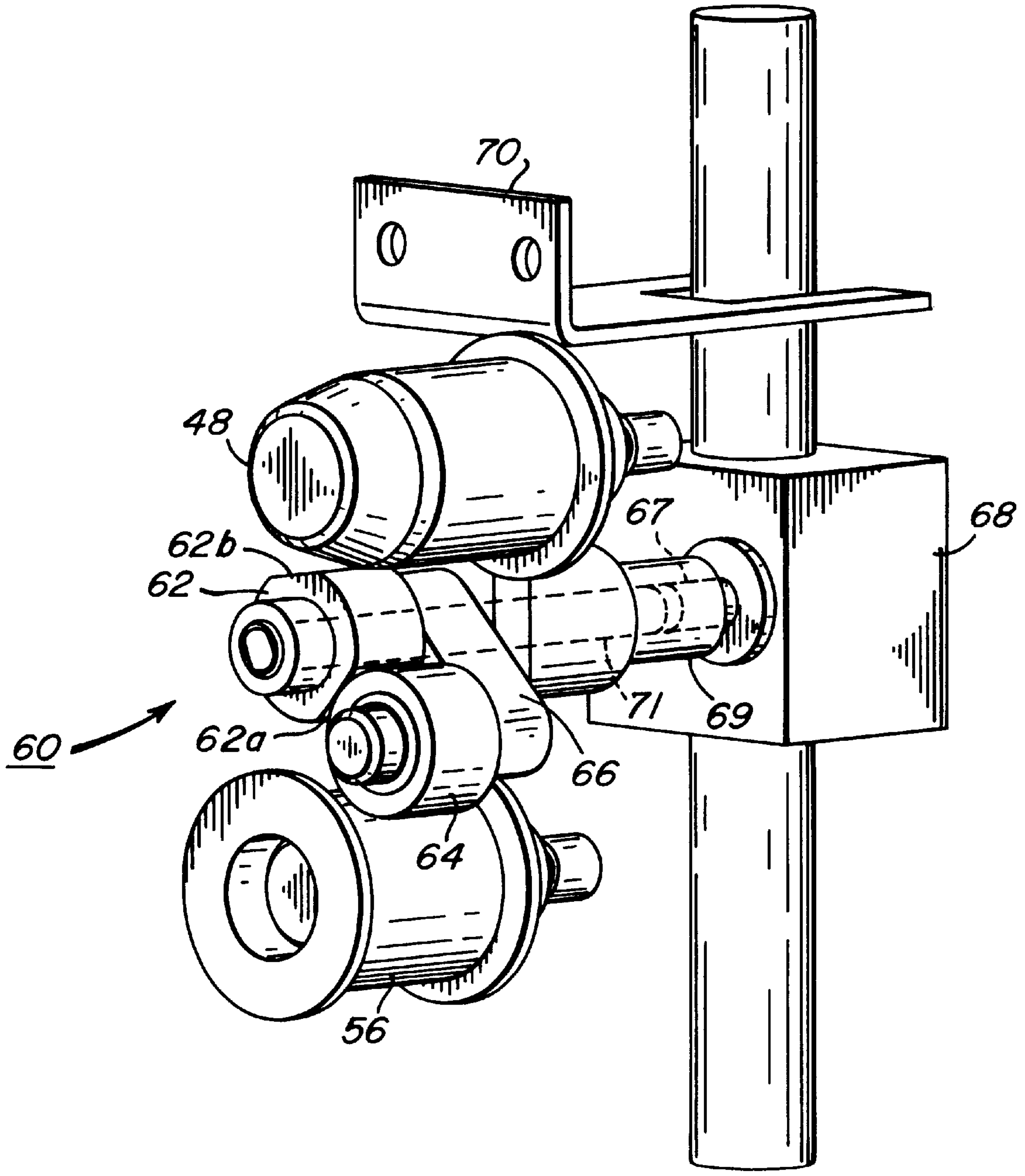
FIG. 3 is a front isometric view of the tensioning drive mechanism constructed in accordance with a particular feature of the invention.

A media tensioning drive mechanism 60 is mounted on panel 34 downstream of the desplicing station 28 and is operative to place the first and second film strips positioned in the desplicing station under tension during the first desplicing cycle in which the first film strip is removed from the splice tape and to place the pickup web and second film strip under tension during the second desplicing cycle in which the second film strip and desplicing tape are separated. As best seen in FIG. 3, tensioning drive mechanism 60 includes film backer roll 48 for engaging said first film strip 12 at least during said first desplicing cycle and pickup web roller 56 for engaging said pickup web 50 at least during said second desplicing cycle; a primary drive roller 62; a secondary drive roller 64, a pivotable arm 66 mounting said secondary drive roller 64 at a position adapted normally for engagement with said primary drive roller 62; and a rotatable drive 68, for example a pneumatically driven rotary actuator, for driving the primary drive roller 62 alternately in counter-clockwise and clockwise direction. A bracket 70 secures the actuator 68 to the rear of panel 34. Drive shaft 67 of actuator 68, in turn, is coupled by a non-flexible coupling 69 to primary drive roller shaft 71. The shaft assembly is supported through an opening in panel 34 by means of a shaft housing. Primary drive roller 62 is provided with two chordal segments 62*a* and 62*b* in which the radial dimension of the drive roller 62 is reduced so as to separate the primary drive roller from the secondary drive roller 64 at certain stages in the operation of the desplicer apparatus. As will be seen, this results in avoiding the formation of undesired flat spots on the secondary drive roller 64. Additionally, the chordal length of segment 62*a* is sufficient to allow manual movement of the secondary drive roller 64 to facilitate insertion of the pickup web between the roller and respective backer roll 56. The chordal segment 62*b* length is sufficient to allow secondary roller to drop away from film backer roll 48 after desplicing of the first film strip and thus to facilitate removal by the operator of the film strip from the desplicer apparatus. Arm 66 is freely pivotable on drive shaft 72 such that rotation of the drive shaft, per se, does not cause the arm to pivot. However, as will be seen more clearly during discussion of the operation of the desplicer, rotation of the primary drive roller 62 will cause the secondary drive roller to be lifted or lowered, depending on the direction of the rotation of the primary roller, until the secondary roller comes into engagement with the respective film or web backer roll. Once the secondary roller is engagement with a media backer roll, attempted continued rotation of the primary drive roller will cause the affected media to be tensioned. The pneumatic rotary actuator 68 is designed in known manner to stall when an appropriate degree of torque is generated to achieve the desired tension on the media.

Figure 4:
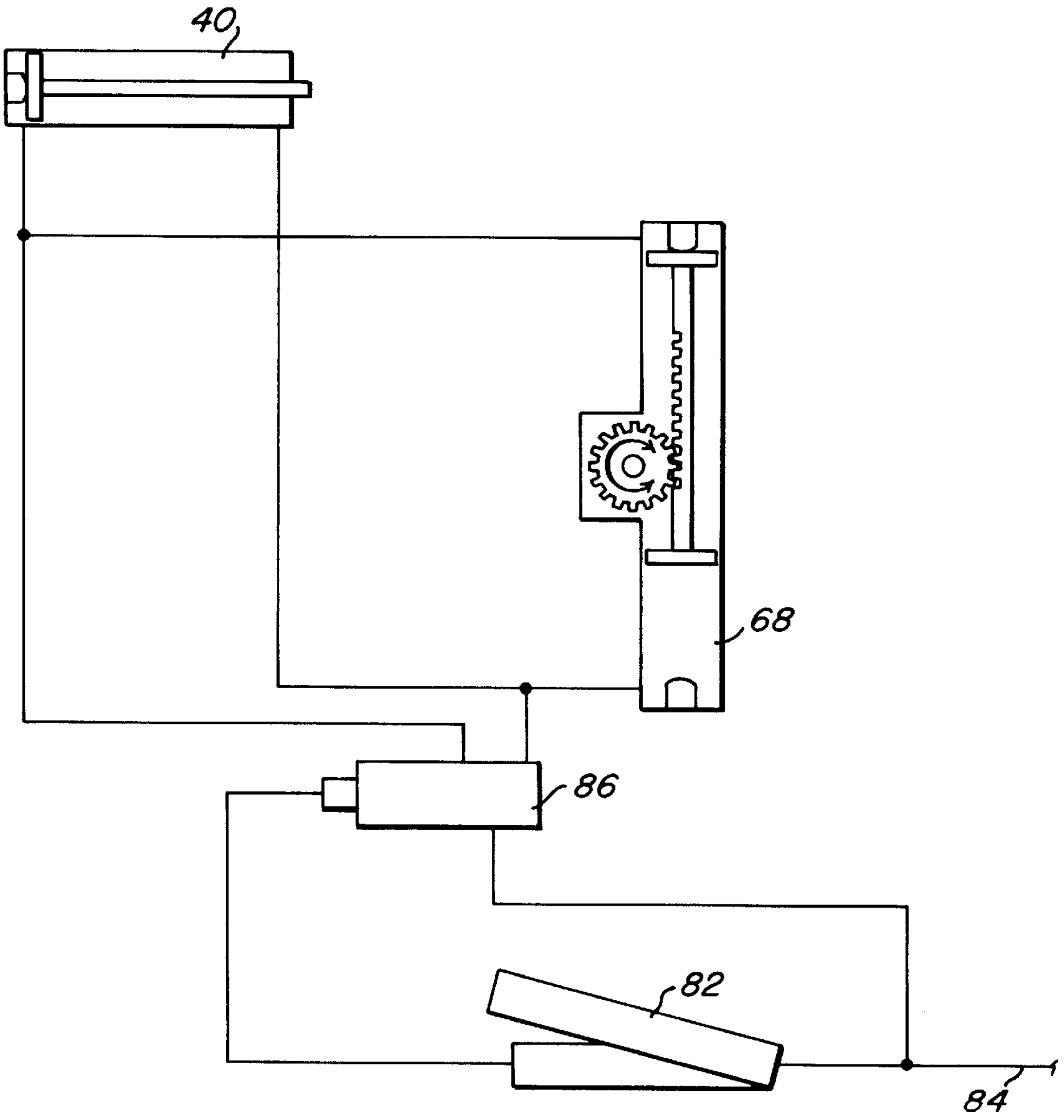
FIG. 4 is a schematic diagram of a hydraulic control system used in the desplicer apparatus of FIG. 1.

Actuation of the rocking motion of the desplicing mechanism 22 and of the rotary motion of the primary drive roller 62 is performed by a foot-operated pneumatic control system schematically illustrated in FIG. 4. The pneumatic system comprises a linear actuator serving as the rocking frame positioning cylinder 40, a rotary actuator 80 for rotating primary drive roller 62 and a user operated foot pedal 82 which couples air pressure from input line 84 to a pilot actuated 4-way valve 86.

Figure 5:
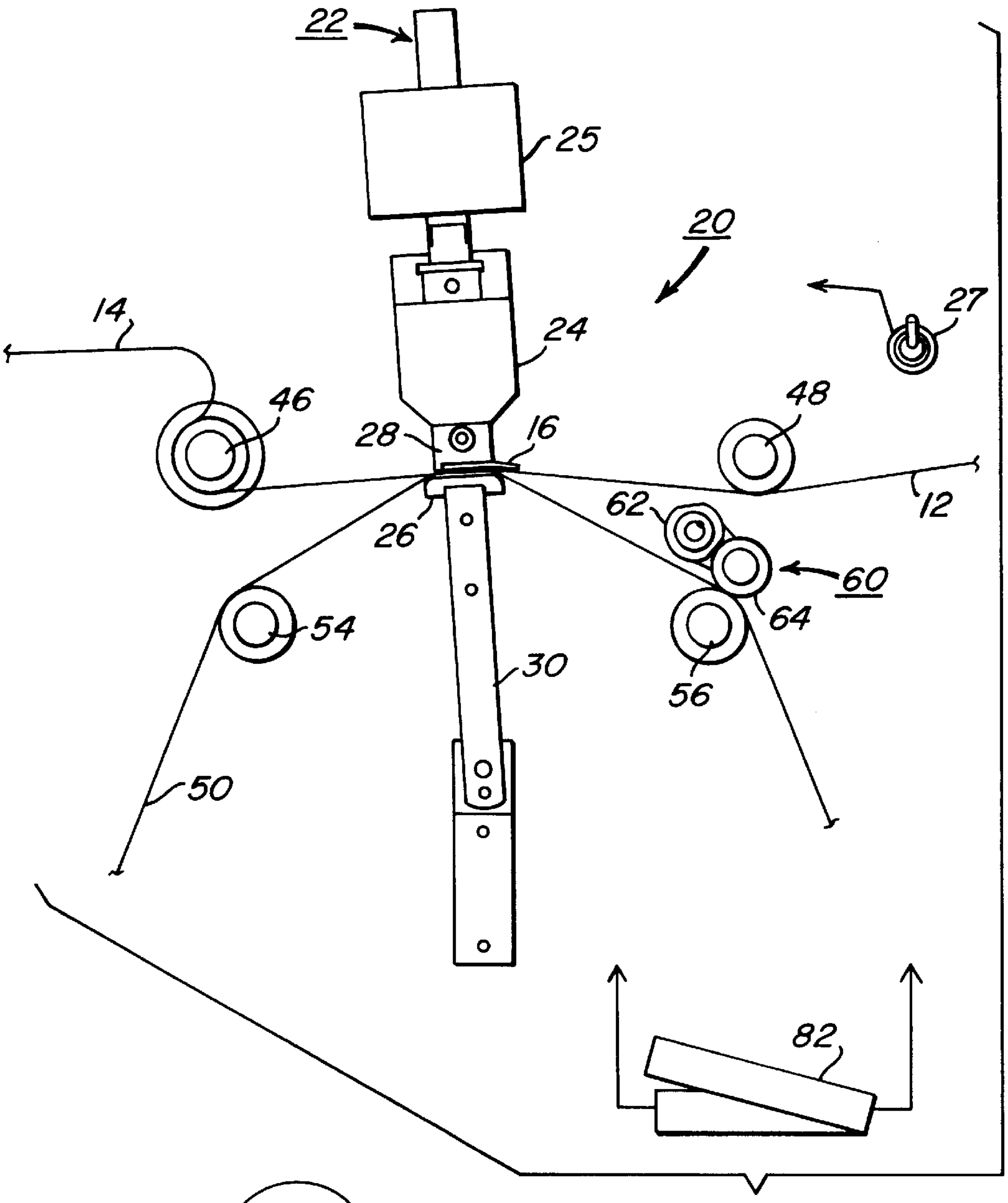
FIG. 5 is a schematic front view of the principal elements of the tensioning drive mechanism.
Figure 5A:
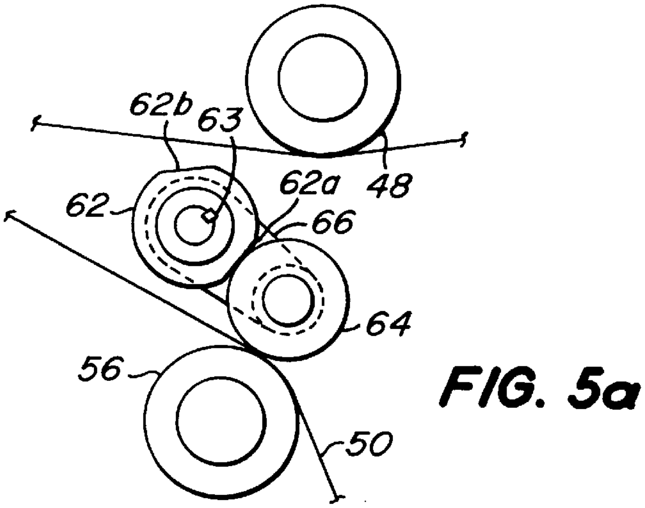

Turning now to FIGS. 5–11, the operation of the desplicing apparatus 20 will be described. FIG. 5 shows the initial setup of the desplicer apparatus 20 in which spliced film strips 12 and 14 and pickup web 50 are threaded into the desplicing apparatus 20. The continuous pickup web 50 is threaded once and incrementally advances with each desplicing operation. When the spliced film is initially threaded onto the apparatus by the operator, and also after each desplicing operation, the operator aligns the left edge of splice tape 16 with a suitable mark (not shown) on the platen 16. The operator then manually clamps with thumb and forefinger of the left hand the second or trailing film strip 14 around the high friction surface of roll 46 and holds the leading or first film strip 12. The film strip 14 remains clamped as shown throughout the desplicing operation. The operator's right hand is used to extend the first film strip 12 past the backer roll 48 and tensioning mechanism 60 with a slight amount of tension on the film strip. In this initial stage, air switch 27 and foot pedal 82 are in their normal state (unactuated). Rocking arm 30 is positioned to its leftmost position by the rocking frame cylinder 40 (FIG. 4). The status of the tension mechanism at this initial stage is best seen in FIG. 5*a*. Primary drive roller 62 is positioned with flat 62*a* aligned with secondary drive roller 64 which, in turn, rests freely against web 50 on web backer roll 56. Drive roller key 63, which is approximately at the two o'clock position at this stage, serves as a convenient reference for indication the rotational position of primary drive roller 62 in the ensuing description.

Figure 6:
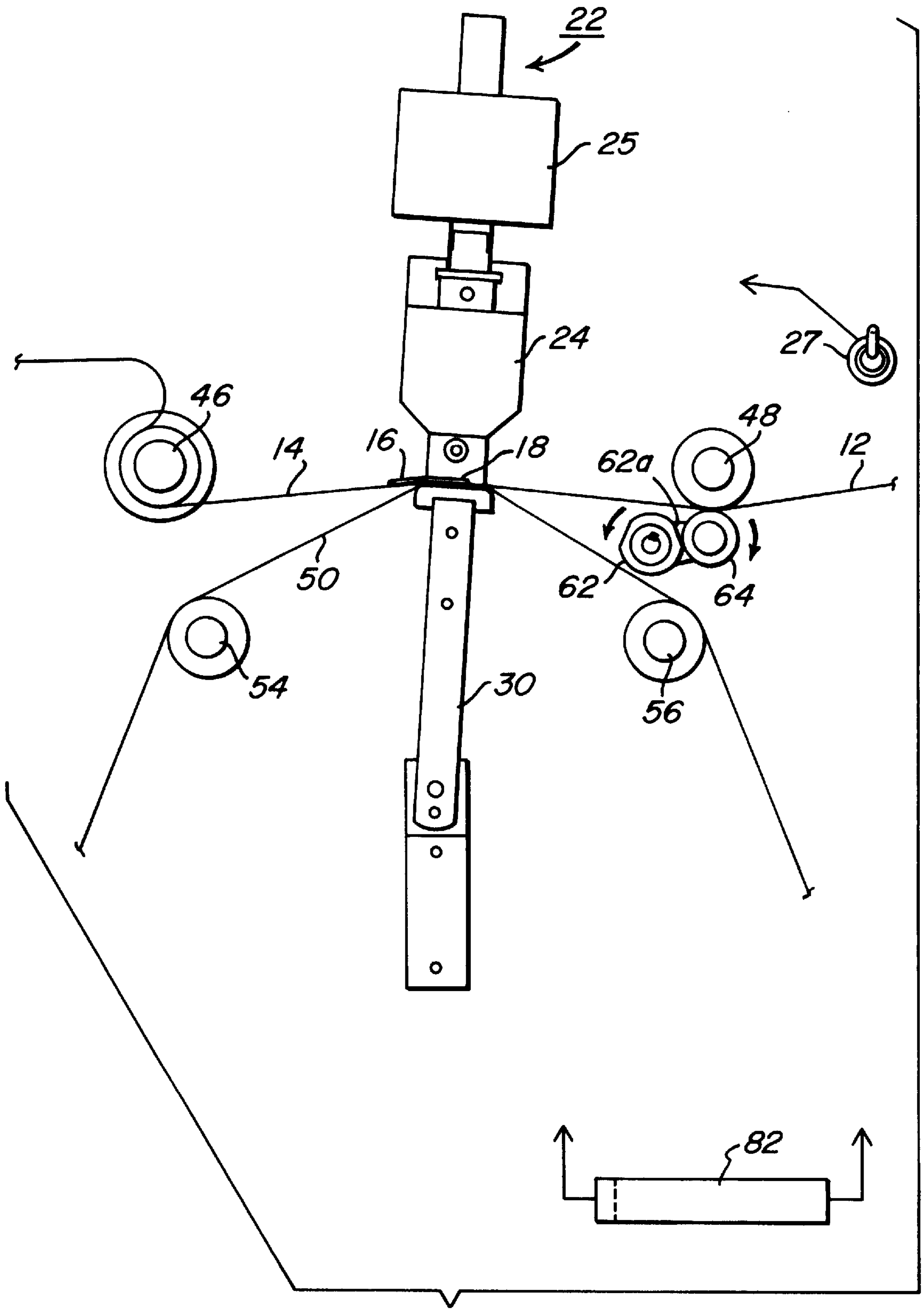

In FIG. 6, foot pedal 82 is depressed by the operator to actuate the rocking frame positioning cylinder 40 moving the rocking frame to the rightmost position in which the desplicing station 28 is aligned with the first region 18 of the splice tape 16. Simultaneously, the rotary actuator 68 is actuated to rotate primary drive roller 62 counterclockwise approximately 60°. This causes the trailing edge of flat 62*a* to engage the secondary drive roller 64 which results in raising of roller 64 into engagement with film strip 12. A slight continued rotation of primary drive roller 62, rotates secondary drive roller clockwise thus tensioning the film strips 12 and 14 extending between rolls 46 and 48. The rotation of the drive rollers stops when actuator 68 stalls, thus holding the tension on the film strips at which point the operator is free to release holding the film strip 12.

Figure 7:
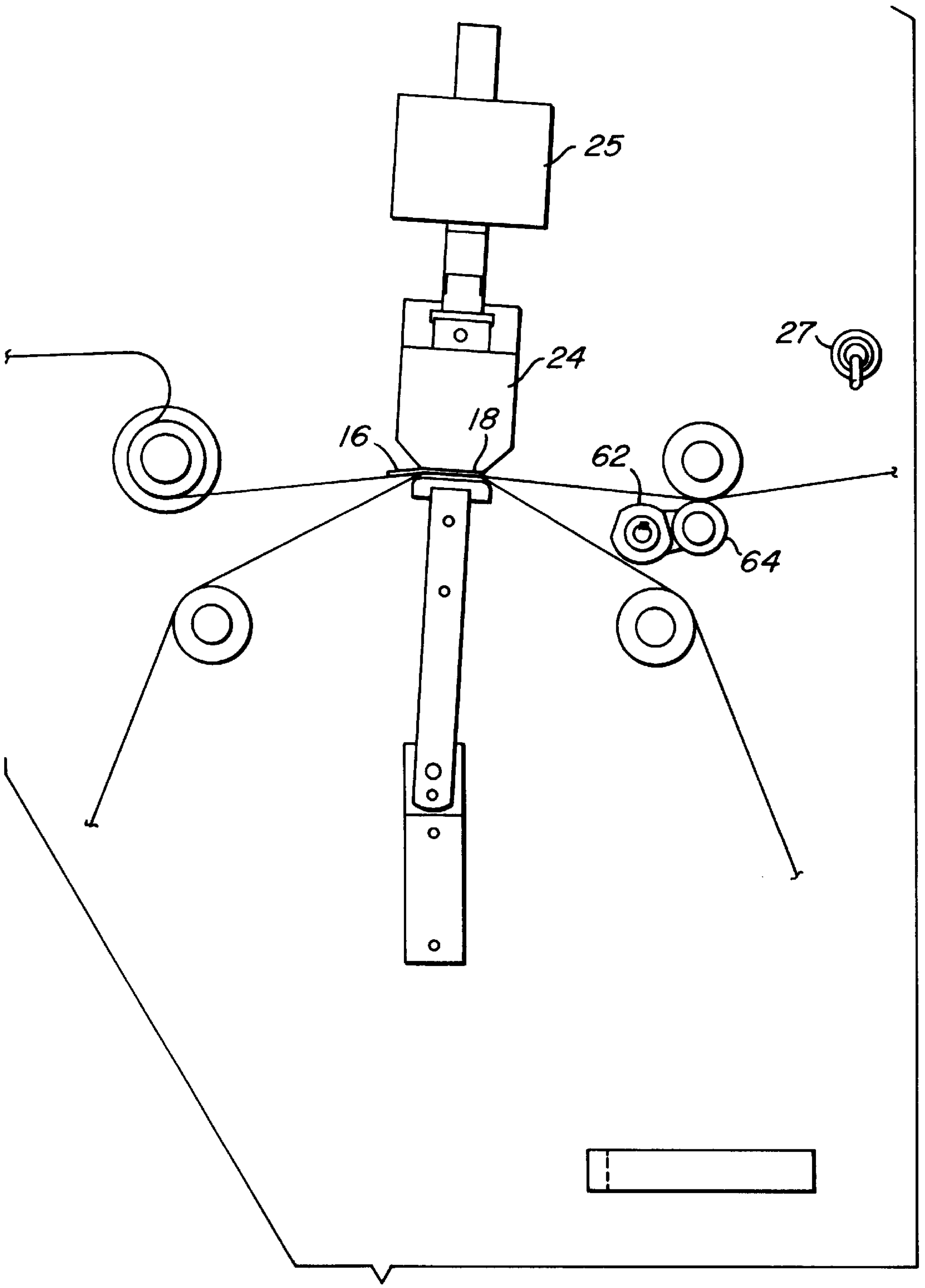
Figure 8:
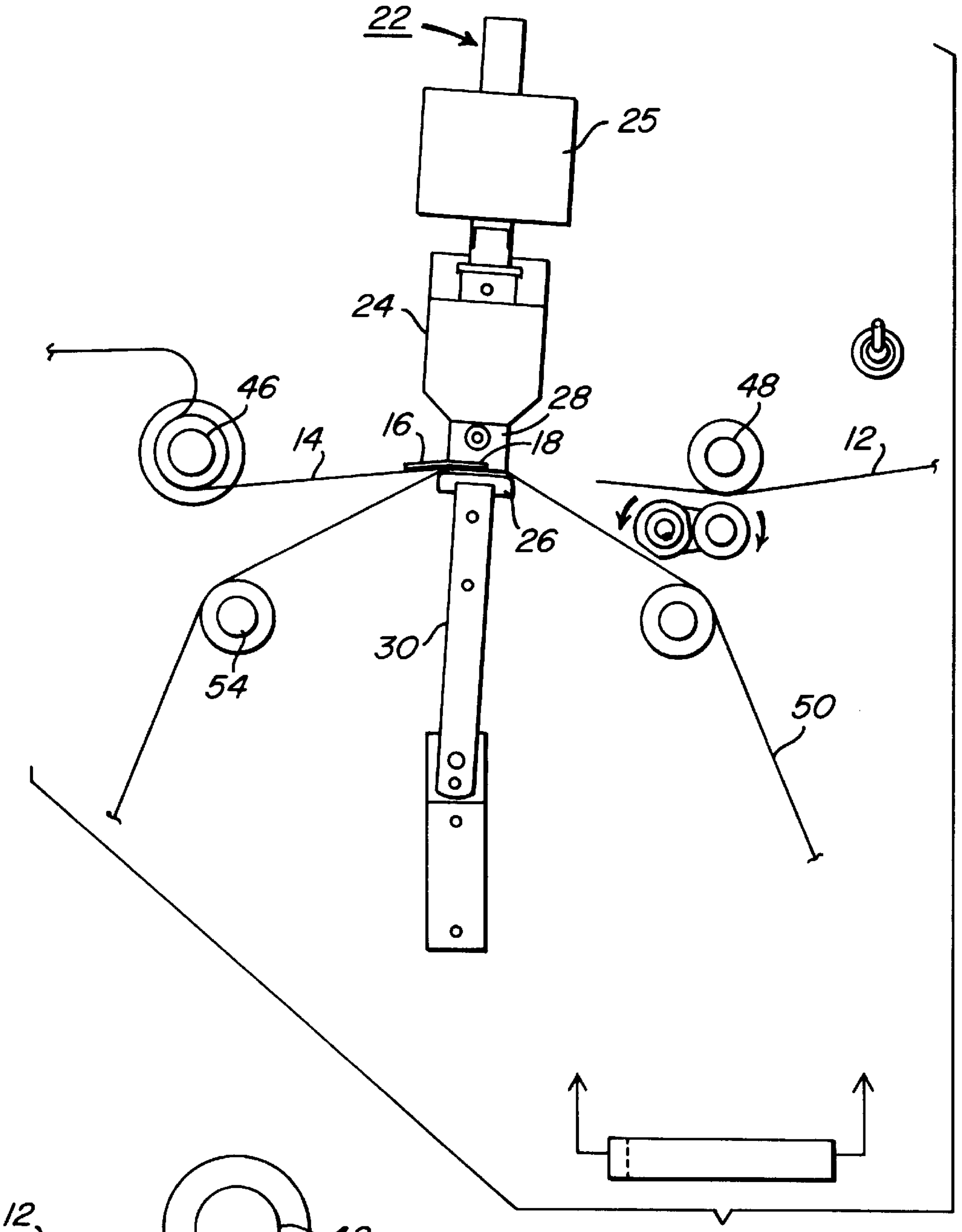
Figure 8A:
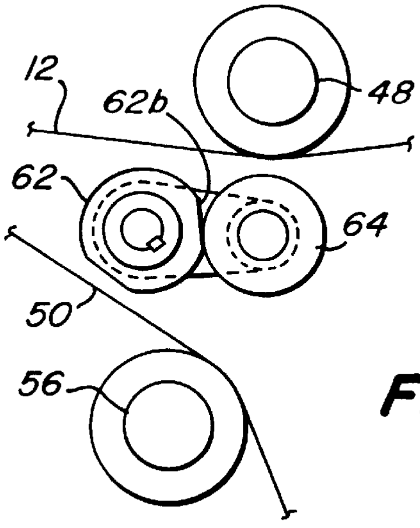

In FIG. 7, the operator has actuated air switch 27 to cause actuator cylinder 25 to press heat head 24 against the film strip in first region 18. The heat from head 24 softens the adhesive on the splice strip. In FIG. 8, foot pedal 82 is still down (actuated) to hold rocker frame 30 in its rightmost position. An automatic timer (not shown) has caused cylinder 25 to release the heat head from the splice tape after a pre-set duration. When the heat head releases, the film strip 12 separates from the splice tape 16 by virtue of the tension applied by secondary drive roller 64. As best seen in FIG. 8*a*, the rotary actuator 68 has completed its counterclockwise rotation of primary drive roller 62 (key 64 now at about five o'clock position) with flat 62*b* facing the secondary drive roller 64. This allows roller 64 to drop away from backer roll 48 and lets the operator remove the despliced film strip 12. The splice tape region 18 remains free of the pickup web at this stage. Because sequencing of the desplicing operations is controlled directly by the operator, if the operator sees that the film strip 12 has not successfully separated from the splice tape at this stage, the desplicing cycle can be repeated by actuation of air switch 27, thus avoiding a malfunction.

Figure 9:
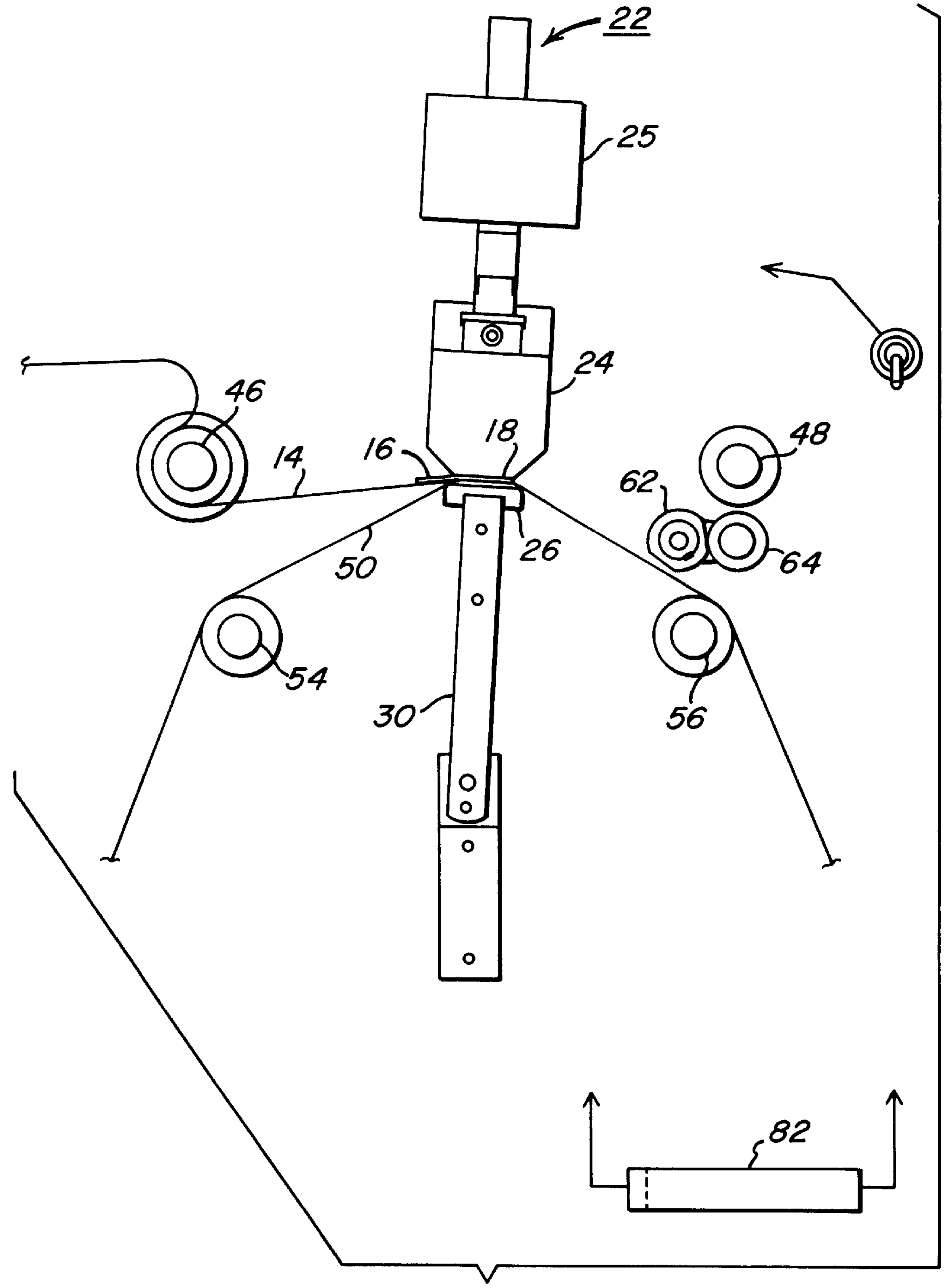
Figure 10:
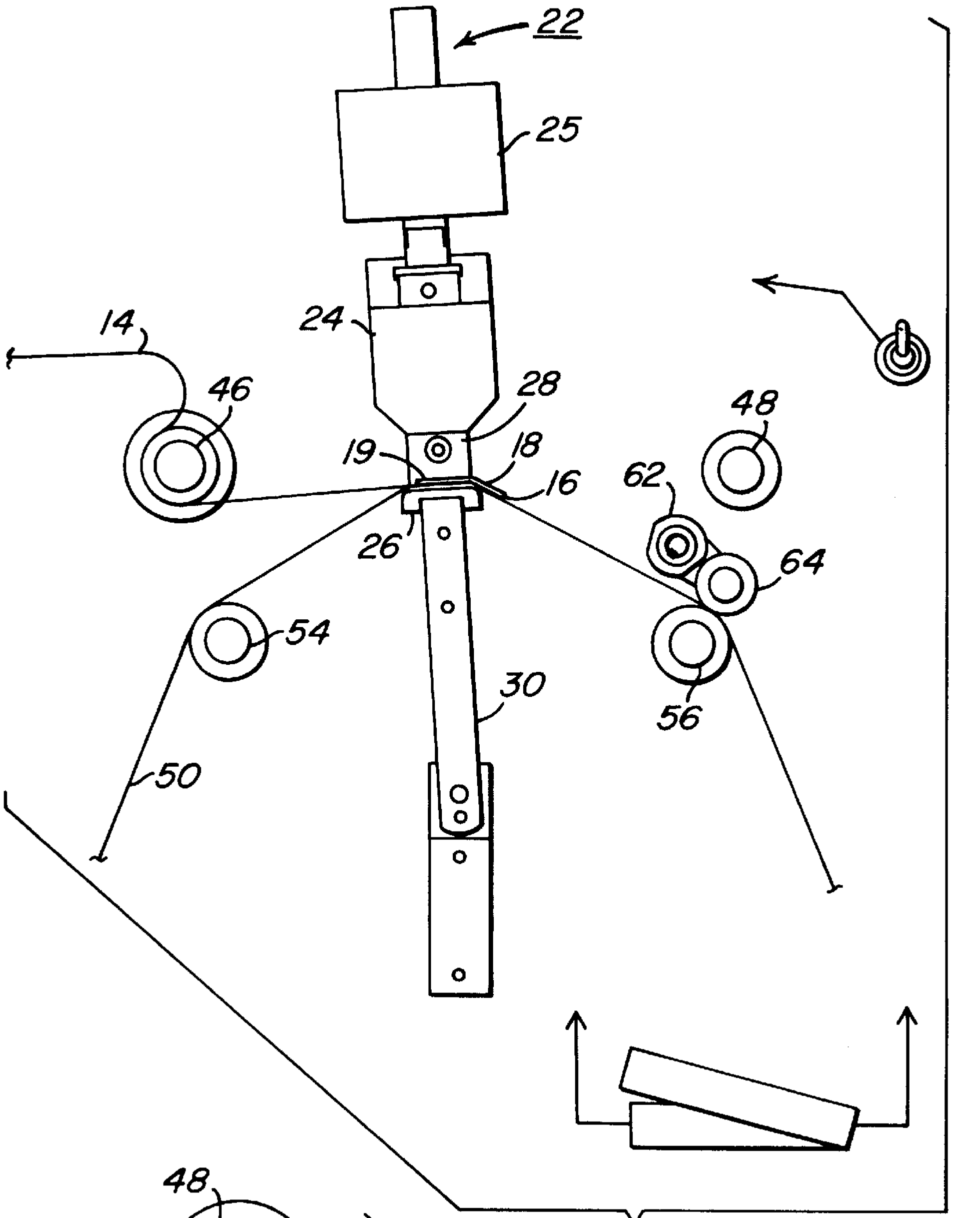
Figure 10A:
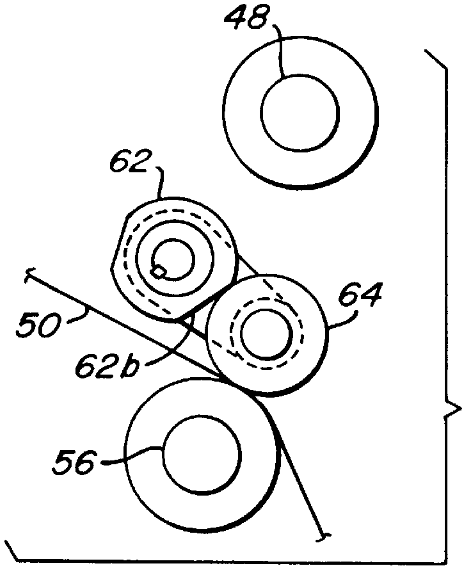

In FIG. 9, the operator has reactuated air switch 27 causing heat head 24 to press and reheat region 18 of the splice tape against the pickup web 50. In FIG. 10, the automatic timer has released air cylinder 25, moving heat head up thereby terminating the first desplicing cycle. The operator has released the foot pedal 82 causing rocking arm 30 to move to the leftmost position placing desplicing station 28 in alignment with region 19 of splice tape 16. Releasing the foot pedal also starts rotation of drive roller 62 in the clockwise direction causing the roller to move about 60° (key 63 at seven o'clock position) to engage the trailing edge of flat 62*b* with secondary drive roller 64. This has caused roller 64 to drop down into engagement with the pickup web 50 against backer roll 56 and to place web 50 under tension as the actuator 68 to stall in the same manner as described above. The tension exists between secondary drive roller 64, through web 50, splice tape 16 and second film strip 14.

Figure 11:
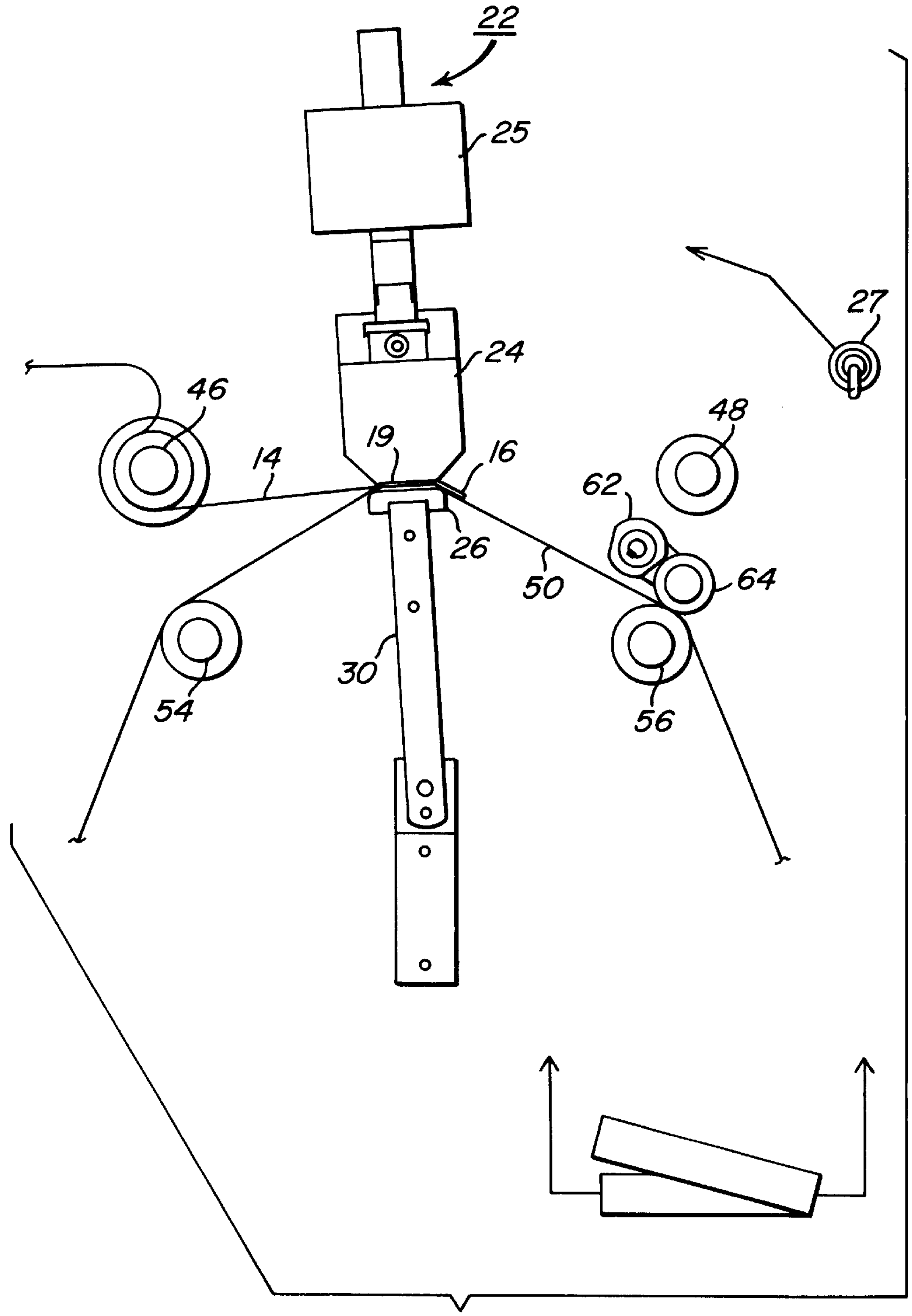
Figure 12:
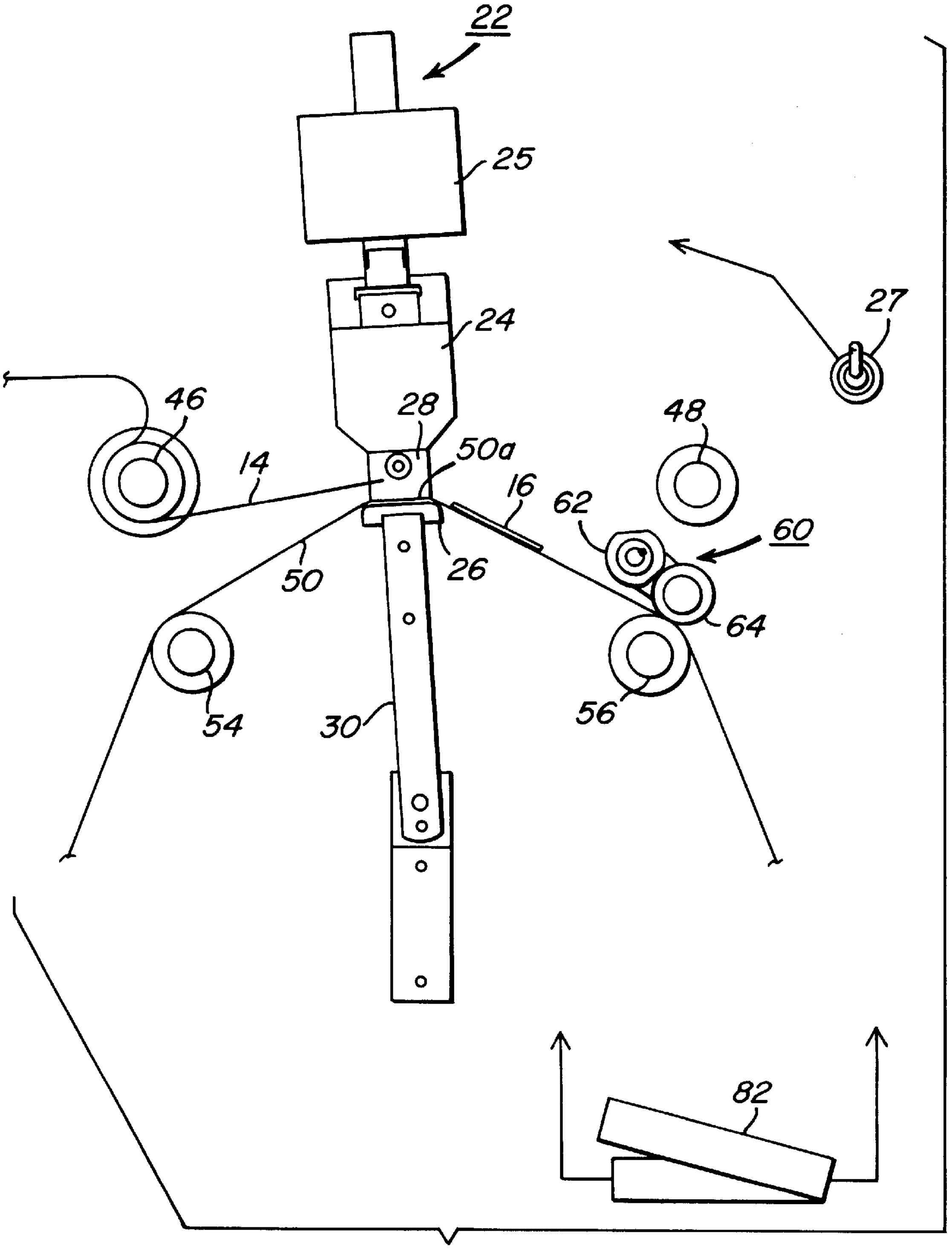

In FIG. 11, the second desplicing cycle is initiated by operator actuation of air switch 27 to press the heat head against region 19 of the splice tape 16. In FIG. 12, the completion of the second desplicing cycle is shown with air cylinder 25 deactuated by the automatic timer. The heat head 24 is returned to its up position and the splice tape 16 has separated from film strip 14 by virtue of the completion of the clockwise rotation of drive roller to its fully clockwise position (with key 63 at its two o'clock position) which, in turn, has caused secondary drive roller to advance web 50 to the right, positioning a new clean area 50*a* of the web into desplicing station 28 in anticipation of the next desplicing operation. In a similar manner as described above, improper desplicing at this stage can be corrected by operator actuation of air switch 27 to repeat the desplicing cycle. At this stage, the operator will the right hand to take hold of the film free end and thread it through the desplicing station and between backer roll 48 and tensioning mechanism 60.

It will be appreciated that what has been described is semi-automatic film desplicing apparatus that is low cost and allows convenient separation of film and splice tapes. The incorporation of the tensioning mechanism entirely on one side of the desplicing mechanism and operative for both cycles of the desplicing operation simplifies the operator's handling of the film during desplicing. In the tensioning mechanism, provision of flats on the primary drive roller synchronized with specific stages in the desplicing operation avoids generation of flats on the secondary drive roller and also facilitates threading of film into the desplicer. Further, the incorporation of two stage tilting of the desplicing mechanism causes the heat head to align automatically with the appropriate splice tape regions in each of the desplicing cycles which simplifies operation by not requiring hand movement to reposition the film between film desplicing cycles.

The invention has been described in detail with particular reference to certain preferred embodiments thereof, but it will be understood that variations and modifications can be effected within the spirit and scope of the invention.

PARTS LIST

10 film splice
12 first film strip
14 second film strip
16 splice tape
18 splice tape region
19 splice tape region
20 desplicing apparatus
22 desplicing mechanism
24 heat head
26 platen
28 desplicing station
30 rocking frame
32 pivot support
34 panel
36 arrow
40 positioning cylinder
42 film reel
44 film reel support arm
46 stationary film backer roll
48 rotating film backer roll
50 pickup web
52 pickup web supply spool
54,56 rotatable pickup web backer rolls
58 pickup web take-up spool
60 media tensioning drive mechanism
62 primary tensioning drive roller
64 secondary tensioning drive roller
66 pivotable arm
67 actuator 68 drive shaft
68 rotary actuator
69 non-flexible coupling
70 tensioning mechanism mounting bracket
71 primary drive roller shaft
72 tensioning mechanism drive shaft
73 shaft assembly support housing
82 foot pedal

What is claimed is:

1. Apparatus for separating first and second photographic film strips from a splice tape, said film strips being attached with thermal adhesive to first and second regions, respectively, of the splice tape, the apparatus comprising:

a desplicing mechanism having a heat head and a platen forming a desplicing station therebetween, said mechanism being mounted for movement laterally between first and second desplicing positions to align said desplicing station sequentially with said first and second regions of the splice tape positioned within said desplicing station;

means for moving said desplicing mechanism to a first position which places said desplicing station in alignment with said first splice tape region during a first desplicing cycle and to a second position which places said desplicing station in alignment with said second splice tape region during a second desplicing cycle;

spliced film supply means upstream of the desplicing station for supplying said first and second spliced film strips to said desplicing mechanism;

pickup web means including a pickup web supply spool upstream of the desplicing station and a pickup web take-up spool downstream of the desplicing station for supplying a splice tape pickup web; and a media tensioning drive mechanism downstream of the desplicing station operative to place said first and second film strips under tension during said first desplicing cycle in which said first film strip is removed from said splice tape and to place said pickup web and second film strip under tension during said second desplicing cycle in which said second film strip and desplicing tape are separated.

2. The apparatus of claim 1 further including desplicing cycle activation means for applying pressure between said heat head and said platen at said first region of splice tape during heating of the heat head to soften said thermal adhesive and for subsequently reducing said pressure to allow tension on said film strip to remove the film strip from the first region of the splice tape.

3. The apparatus of claim 2 said activation means being operative to reapply pressure between said heat head and said platen at said first splice tape region during heating of the heat head to adhere said first region of splice tape to said take-up web.

4. The apparatus of claim 3 wherein, during said second desplicing cycle, said activation means is operative to apply pressure between said heat head and said platen and subsequently reduces said pressure to allow tension on said pickup web to separate the film strip from the second region of the splice tape.

5. The apparatus of claim 1 further including a stationary clamping device positioned between said spliced film supply means and said desplicing mechanism for holding said second film strip in tension with said tensioning drive mechanism during said first and second desplicing cycles.

6. The apparatus of claim 5 wherein said clamping device comprises a non-rotatable film clamp roll having a high friction surface for engaging said second film strip during said desplicing cycles.

7. The apparatus of claim 1 wherein said tensioning drive mechanism comprises a film backer roll for engaging said first film strip at least during said first desplicing cycle and a pickup web backer roll for engaging said pickup web at least during said second desplicing cycle; a primary drive roller; a secondary drive roller, a pivotable arm mounting said secondary drive roller at a position adapted for engagement with said primary drive roller; and a rotatable drive for driving said primary roller in one direction to pivot said secondary roller into a tensioning drive relationship with said first film strip during said first desplicing cycle; and for driving said primary roller in a reverse direction to pivot said secondary roller into a tensioning drive relationship with said pickup web during said second desplicing cycle.

8. The apparatus of claim 7 wherein said primary drive roller includes at least one reduced radius segment, said primary drive roller being rotationally positioned prior to said first desplicing cycle with said reduced radius segment aligned with the secondary drive roller to disengage said primary drive roller from said secondary drive roller allowing free rotation of the secondary drive roller thereby avoiding the formation of a flat segment on the secondary drive roller.

9. The apparatus of claim 8 wherein said reduced radius segment is of sufficient length such that with said reduced radius segment being aligned with said secondary drive roller prior to said first desplicing cycle, the secondary drive roller is movable out of contact with said pickup web backer roll thereby facilitating loading of said pickup web between the pickup web backer roll and secondary drive roller.

10. The apparatus of claim 7 wherein said primary drive roller includes a second reduced radius segment, said primary drive roller being rotationally positioned between said first and second desplicing cycles with said second reduced segment facing the secondary drive roller to disengage said primary drive roller from said secondary drive roller allowing free rotation of the secondary roller thereby avoiding the formation of a flat segment on the secondary drive roller.

11. The apparatus of claim 10 wherein said reduced radius segment is of sufficient length such that with said rotational positioning set between said first and second desplicing cycle, the secondary drive roller is movable out of contact with said film backer roll thereby facilitating removal of said first film strip from between said film and secondary rollers.

12. The apparatus of claim 1 in which said desplicing mechanism is mounted for pivotable movement of said desplicing station between said first and second desplicing positions and said moving means is operative to pivot said desplicing mechanism between said first and second desplicing positions.

* * * * *